(12) United States Patent
Snyder

(10) Patent No.: US 6,783,303 B2
(45) Date of Patent: Aug. 31, 2004

(54) DOCK BUMPER SYSTEM USING BOAT FENDERS

(75) Inventor: Thomas M. Snyder, St. Petersburg, FL (US)

(73) Assignee: James T. Dunlap, St. Peterburg, FL (US)

( * ) Notice: Subject to any disclaimer, the term of this patent is extended or adjusted under 35 U.S.C. 154(b) by 0 days.

(21) Appl. No.: 10/232,741

(22) Filed: Aug. 30, 2002

(65) Prior Publication Data

US 2003/0049078 A1 Mar. 13, 2003

Related U.S. Application Data

(60) Provisional application No. 60/318,002, filed on Sep. 10, 2001.

(51) Int. Cl.[7] ............................................. E02B 3/26
(52) U.S. Cl. ...................................... 405/212; 114/219
(58) Field of Search .............................. 405/211, 211.1, 405/212, 215, 216; 114/219; 404/6; 256/13.1

(56) References Cited

U.S. PATENT DOCUMENTS

| | | | | | |
|---|---|---|---|---|---|
| 4,351,257 A | * | 9/1982 | Brown, Jr. | ................... | 114/219 |
| 5,018,471 A | * | 5/1991 | Stevens | ...................... | 405/211 |
| 5,562,364 A | * | 10/1996 | Darder-Alomar | ........... | 405/215 |
| 6,327,989 B1 | * | 12/2001 | Beach | ........................ | 114/219 |

* cited by examiner

Primary Examiner—Thomas B. Will
Assistant Examiner—Tara L. Mayo
(74) Attorney, Agent, or Firm—Donald W. Meeker

(57) ABSTRACT

Flexible brackets or "wings" molded from marine grade, UV resistant PVC allow attachment of inflatable boat fenders to any piling or dock structure regardless of shape or size. Adjustable straps are used to encompass the fender and fasten it to the "wings" allowing use of any size fender from six to twelve inches in diameter. A short section of line is used to secure the fenders, when used vertically, to an eye screw fastened to the piling or structure in a location above the fenders where the line can pass through the central opening in the fenders and tie in a large knot at the bottom of the fenders.

10 Claims, 1 Drawing Sheet

DOCK BUMPER SYSTEM USING BOAT FENDERS

CLAIM OF PROVISIONAL APPLICATION RIGHTS

This application claims the benefit of U.S. Provisional Patent Application No. 60/318,002, filed on Sep. 10, 2001.

BACKGROUND OF THE INVENTION

1. Field of the Invention

The present invention relates to a resilient marine fender for protecting a boat or other marine vessel or craft from damage resulting from impact against a marine structure such as a boat dock, pier or like marine structure and in particular to a device for securing inflatable boat fenders to a dock or pier so that the fenders do not move away from the dock or pier and thereby prevent contact of the boat with the dock or pier.

2. Description of the Prior Art

The purpose of a boat fender or bumper is to protect the stem, transom, hull, gunwale or bonding flange of a boat from being damaged when moored to a fixed or floating dock, slip, pier, piling or similar structure. As used herein, "fender" means a device which hangs over a stem or fantail or a gunwale, while "bumper" means a device, similar to a car bumper, attached to a gunwale, hull, stem or fantail or, in this case, the present invention refers to a system for attaching a boat fender to a dock or piling thereby converting it into what is being called a dock bumper.

Pleasure boating has long been a popular outdoor activity. The boats, ranging from racers to sail boats to yachts, may be moored at various marine docks owned by restaurants, seaside resorts, as well as public and private marinas.

Even though it is common for a pleasure boat to incorporate a rub-rail about the top edge of the hull and about the perimeter of the deck, the rub-rail is not designed to take the full impact of many bumps encountered against dock posts. Consequently, the dock posts need to have a protective bumper or cushion to protect the boat in conjunction with the rub-rail.

Many bumper systems have been developed. Rubber pads that are secured by screws, stakes or nails are often ripped from their fastened position because of the high stresses exerted on the rubber pads around the nail or screw head.

Fenders have been developed that are mounted on the boat. The disadvantage of these portable systems is twofold. Firstly, in order to be effective, the fender has to be correctly positioned on the boat such that the dock post hits the boat at the section protected by the fender. It is not an easy task to predict where to correctly place the bumper on the boat since water conditions are in constant change. Secondly, the boat fender must be transported with the boat during its entire voyage as unnecessary and unused cargo.

In previous methods of positioning and securing fenders in place to pilings and dock structures, the fenders are attached with lines to the vessel or the dock structure which allow movement of the fenders which, in turn, often allow contact between the boat and the dock or pier.

Packaging, cushions, carpeting and even corrugated cardboard have been strapped to dock posts with duct tape in attempts to provide protection to a moored boat. These temporary solutions, however, rapidly degrade and quickly become unsightly.

A fender or bumper also protects the mooring structure from being damaged by the boat. A moored boat does not remain stationary but floats up and down and back and forth in the water while banging, bumping and rubbing up against the mooring structure. As the amplitude and frequency of the waves increase, the pitching and rolling of the boat intensifies, increasing the likelihood that the boat will be damaged. Consequently, many recreational boaters consider fenders or bumpers to be necessary accessories.

A type of boat fender in wide use is in the form of a cylindrical, elongated tube, rounded at both ends and filled either with air or a cellular foam inner core to cushion and absorb the shock of the boat bumping and banging against the mooring structure. Typically, the fender has a nylon cord at its upper end which is tied to a cleat on the gunwale. The fender simply hangs down from the gunwale to protect the hull, or hangs over the stem to protect the transom. The disadvantage of this type of fender occurs when a boat is moored at a dock. As the boat pitches and rolls, the fender does not stay in place but is turned sideways or lifted up by the waves onto the deck, allowing the boat to go under the dock where it can suffer serious damage.

While many attempts have been made to provide a solution to the problem of protecting a boat while docking and while being moored or tied to the dock, none provide a readily available, easy-to-apply system which prevents movement of a boat fender or docking structure bumper.

U.S. Pat. No. 5,018,471, issued May 28, 1991 to William E. Stevens, claims a resilient marine fender for protecting a boat from damage resulting from impact against a boat dock, piling or other marine structure includes a fender body having an elongate bumper portion on one side of sufficient resiliency to cushion normal impact of the boat and mounting surface on the opposite side thereof of sufficiently frictional character with respect to the piling for generally non-slipping engagement therewith. Selectively engagable and disengagable strap means at the lateral sides of the fender body encircle the pilling for selectively securing the fender body to the piling such that the mounting surface is held in frictional facing contact against the piling. A number of elongate bumper portions can be disposed in side-by-side relation to one another on the fender body and a plurality of strap assemblies can be provided.

U.S. Pat. No. 4,351,257, issued Sep. 28, 1982 to Louis S. Brown, Jr., describes a marine fender having high energy absorption capacity, low reaction force, a smooth exterior surface and no extensive exterior support structure to preclude snagging and reduce maintenance is provided. The fender comprises a resilient core having a cylindrical central portion tapering at each end to a truncated cone-shaped end portion, a fitting at each end of the core disposed coaxially with an axial bore in the core, flexible strength member in the axial bore interconnecting the fittings and providing means for adjustably biasing the fittings toward each other, and a flexible elastomeric skin enclosing the core and substantial portions of each fitting to protect the core from wear and abrasion and to distribute impact loads evenly over the core and fittings.

U.S. Pat. No. 6,095,074, issued Aug. 1, 2000 to Jay A. Reinhardt, is a bumper for a boat dock is provided which is durable, resilient and visible at night. The bumper is constructed of an expanded polymer such as polyethylene or polypropylene. The bumper is preferably made of translucent polyethylene foam with a density of between 2 and 4 pounds per cubic foot. When polyethylene foam is subjected to impact, it absorbs the force of the impact and returns to its original shape. The present invention includes a light for illumination of the bumper itself or illumination of an area immediately adjacent the bumper. A slot in the bumper is provided for accepting the illumination source. If the bumper is translucent, as with white polyethylene foam, the illumination source may be inserted into the back of the bumper such that light is emitted through the front of the bumper. If the bumper is opaque, the illumination source may be inserted into a slot in the bottom of the bumper so that the light is emitted from the bottom of the bumper. The illumination source may be controlled by a radio frequency switch or by a timer.

U.S. Pat. No. 4,964,760, issued Oct. 23, 1990 to Thomas J. Hartman, shows a bumper guard for protecting a boat at a dock includes a longitudinal body composed of molded urethane, a fastener extending through at least one opening formed in the body for fastening the body to a dock, and a reinforcing disk molded into the body at the location of each opening. The reinforcing disk is engagable by the fastener to prevent the fastener from pulling through the opening during fastening of the body to the dock.

U.S. Pat. No. 3,975,916, issued Aug. 24, 1976 to Bert E. Watson, discloses a pier bumper assembly intended particularly for marine application, for protecting dock pilings and dolphins from impact and chafing by contact with ships and barges. The bumper assembly is vertically oriented, and is secured over an exposed face of a marine piling. The pier bumper, which may have a substantial vertical height (e.g., 16 feet would not be unusual) is comprised of a vertically laminated stack of elastic plates, which are held under substantial compression by rods extending vertically through the stack. Along one side, the elastic plates are of deeply concave contour, to receive and partly embrace the generally cylindrical contours of the marine piling. A generally flat front face forms the impact surface. At two or more locations along the overall vertical length of the bumper assembly, one or more of the plates are recessed and curved, to form a retaining groove. Cables received in the retaining grooves serve to secure the bumpers to the marine piling. Typically, the dock bumpers of the invention may be utilized in conjunction with a plurality of side-by-side marine pilings, providing cooperative interaction between adjacent bumper assemblies.

U.S. Pat. No. 3,950,953, issued Apr. 20, 1976 to Joseph E. Matthews, indicates a piling fender is formed of non-rigid materials and has an inner face shaped for engagement against the piling and an opposite outwardly extended crown. A bore is formed within the fender behind the crown to permit compression. Outwardly extended wing flaps have projecting corners and the outer surface of the fender is concave between the crown and the projecting corners. Fasteners are extended through the wing flaps between the crown and the projecting corners.

U.S. Pat. No. 5,518,342, issued May 21, 1996 to Wright, et al., concerns a protective bumper assembly (20) for a dock post (14) includes an elastomeric pad (24) that is wrapped about the post (14). Tie straps (34) have one end (36) adhered to the pad (24) and a distal end (38) that is long enough to wrap about the post (14) and overlie the adhered end (36). The straps (34) mount two complementary fasteners (37) and (39) to secure the distal end to the adhered end and retain the pad (24) about the post. A hook (50) is secured onto one of the straps. The hook is sized to storably receive an unused tie line (22) for a boat.

U.S. Pat. No. 6,327,989, issued Dec. 11, 2001 to Edwin Roy Beach, illustrates a fender bracket for a round piling includes two elongate piling bracket members, each having a generally concave-shaped longitudinal side and a generally flat side forming an acute angle with the concave-shaped longitudinal side. The fender bracket is secured to the round piling and the at least one bumper guard support member is secured to the elongate piling bracket members from the water side of the dock. At least one bumper guard is secured to the bumper guard support member in a longitudinal orientation generally parallel to a water surface. The fender bracket is secured to the round piling in such a manner as to be easily detachable for portability.

U.S. Pat. No. 5,839,854, issued Nov. 24, 1998 to Streszoff, et al., is for a fender system for protecting a high curvature surface includes a top layer of UHMWP, a middle resilient layer of elastomeric material and a base layer. The base layer and resilient layer have notches provided therein to facilitate bending the fender system in accordance with the curved surface.

There is a need for a permanently secured fender to a boat docking structure forming a dock bumper which is readily available, easy to install, and is not movable upon the impact of a boat.

SUMMARY OF THE INVENTION

An object of the present invention is to use existing inflatable boat fenders as dock or pier bumpers by securing the boat fender to the dock or pier so that there is flexibility in receiving impact of the boat, but no displacement or movement of the fender from its secured position.

Another object of the present invention is to provide a versatile, attachable boat fender to docks and piers which can be used singly for horizontal or vertical mounting in non-tidal areas or, stacked vertically with multiple fenders to accommodate use in coastal tide zones.

An additional object of the present invention is to provide a marine fender which can be quickly and reliably secured to and removed from a marine structure, such as a vertical piling or horizontal dock, and which maintains its desired position when secured on the piling or dock even after repeated contact by marine craft.

One more object of the present invention is to provide a system which permits a fender to remain in the same position relative to the boat portion it protects regardless of sea state.

A further object of the present invention is to provide a system which uses flexible attaching hardware molded from marine grade, UV resistant PVC which can be attached to any piling or dock structure regardless of shape or size.

A contributory object of the present invention is to provide a system which includes adjustable straps used to encircle the entire fender and fasten to the attaching hardware so that any size fender may be used from six to twelve inches in diameter.

An added object of the present invention is to include a backup securing feature in the form of a short section of line used to secure the fenders together when used vertically to an eye screw fastened to the piling above the fenders.

A subsequent object of the present invention is to provide for all fasteners to be made from high-grade, corrosion resistant stainless steel.

An ensuing object of the present invention is that installation can be performed using simple hand tools and accomplished in a short amount of time.

In brief, flexible brackets or "wings," supplied at 4 per unit, molded from marine grade, UV resistant PVC, allow attachment of inflatable boat fenders to any piling or dock structure regardless of shape or size via three screw holes in each bracket or wing. Adjustable straps, preferably 1"×48" nylon with a ladder lock type buckle, are used to encompass the fender, by passing through slots in the brackets or wings, and to fasten it to the "wings." This allows the use of any size fender from six to twelve inches in diameter. A short section of line (rope) is then used to secure the fenders, when used vertically, to an eye screw that is fastened to the piling or structure in a location above the fenders. The line passes through the central opening in the fenders and ties in a large knot at the bottom of the fenders. Fasteners for attaching the brackets or wings to the dock or pier can include self-tapping screws, fender washers and eye screw which are high-grade, corrosion resistant stainless steel. Installation using simple hand tools is easy and can be accomplished by the average person in approximately one half of an hour.

An advantage of the present invention is to use readily available inflatable boat fenders as dock or pier bumpers by securing the boat fenders to the dock or pier.

Another advantage of the present invention is to provide a versatile, attachable fender for docks and piers which can be used singly or stacked vertically.

An additional advantage of the present invention is to provide a marine fender which can be quickly and reliably secured to and removed from a marine structure.

One more advantage of the present invention is to provide a marine fender which maintains its desired, secured position on the piling or dock even after repeated contact by marine craft.

Yet another advantage of the present invention is to provide a fender system whose position will remain constant regardless of sea state.

Still another advantage of the present invention is to provide a system which uses flexible attaching brackets molded from marine grade, UV resistant PVC for a long lasting structure.

An ancillary advantage of the present invention is to provide a system which includes adjustable straps so that any size fender may be used and fastened to the piling or pier.

Yet another object of the present invention is to include a backup securing feature in the form of a short section of line for extra strength and durability.

An auxiliary object of the present invention is to provide for all fasteners to be made from high-grade, corrosion-resistant stainless steel for durability and weather resistance.

Still another object of the present invention is to make installation simple and accomplished in a short amount of time.

BRIEF DESCRIPTION OF THE DRAWINGS

These and other details of my invention will be described in connection with the accompanying drawings, which are furnished only by way of illustration and not in limitation of the invention, and in which drawings.

BEST MODE FOR CARRYING OUT THE INVENTION

Figure 1:
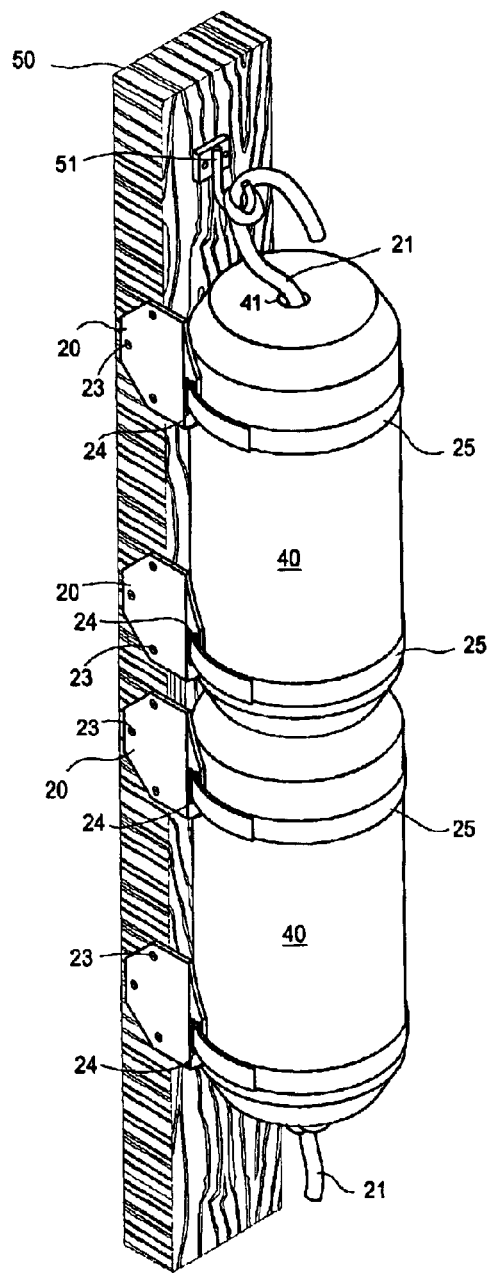
FIG. 1 is a perspective view showing two boat bumpers secured to an upright element on a boat docking structure by the dock bumper attaching system of the present invention.
Figure 2:
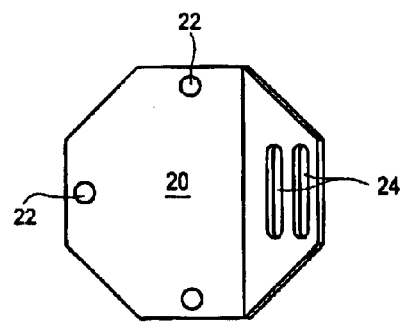
FIG. 2 as a plan view of a bracket of the present invention.
Figure 3:
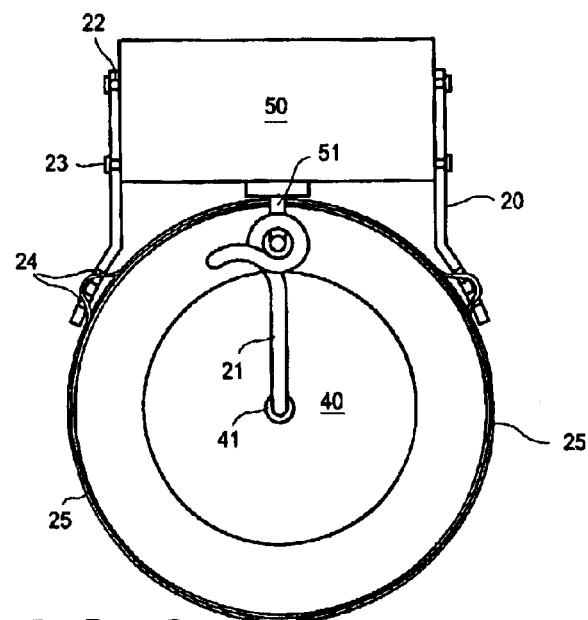
FIG. 3 is a top plan view of a boat fender attached to an upright of the boat docking structure.

FIGS. 1–3 illustrates a dock bumper attaching system for boat docks and piers which attaches conventional boat fenders to docks and piers. The system is comprised of at least one strap means 25 used to encircle and secure a boat fender 40 to a boat docking structure 50.

FIGS. 1–3 illustrate at least two brackets 20 which have a means for attaching to the boat docking structure 50 with one bracket 20 on each side of the fender 40 and also a means for receiving the strap 25 adjustably secured to the brackets 20 used for securing the fender 40 to the boat docking structure 50 between the two brackets 20. The strap completely encircles the fender as seen in FIG. 3.

In FIG. 1, four brackets 20 and two straps 25 are used to secure each boat fender 40 to the boat docking structure 50 thereby preventing movement of the boat fenders 40 relative to the boat docking structure 50 upon impact of a boat with the dock bumper system.

In FIGS. 1–3, each of the brackets 20 is comprised of a flat structure of strong tear-resistant flexible material having a series of openings 22 through the bracket to receive a series of screw means 23 for attaching each of the brackets 20 to a boat docking structure 50.

In FIGS. 1–3, each of the brackets 20 is further comprised of two parallel slotted openings 24 through the bracket 20 on a portion of the bracket 20 extending away from the boat docking structure 50 meant for receiving an end of one of the strap means 25 through the two slotted openings 24 for adjustably securing the end of the strap means 25 to the bracket.

In FIGS. 1 and 3, at least one boat fender 40 is further comprised of an opening 41 through a longitudinal centerline and a line means 21 which is capable of being attached to the boat docking structure 50 by a hook or eyebolt and is capable of inserting through the opening 41 in at least one boat fender 40 to assist in securing the boat fender 40 to the boat docking structure 50.

In FIG. 1, a series of boat fenders 40 are aligned linearly (and vertically?) and attached to the boat docking structure 50 with two sets of brackets 20 and strap means 25 applied to each of the boat fenders 40.

A series of boat fenders 40 may be aligned linearly along a horizontal portion of the boat docking structure 50 with a linear alignment similar to that of FIG. 1, only positioned horizontally as if along a horizontal edge of a dock.

In FIGS. 1 and 3, at least one boat fender 40 is further comprised of an opening through a longitudinal centerline. The opening 41 through the longitudinal centerline has a line means 21 which is capable of being attached to the boat docking structure 50 above at least one fender 40 and is also capable of being inserted through the opening 26 in at least one boat fender 40 to assist in securing the boat fender 40 to the boat docking structure 50 with the line means 21 tied in a knot at a bottom of the fender 40, larger than the opening 41 through the longitudinal centerline in the boat fender 40.

It is understood that the preceding description is given merely by way of illustration and not in limitation of the invention and that various modifications may be made thereto without departing from the spirit of the invention as claimed.

What is claimed is:

1. A dock bumper attaching system for boat docks and piers for attaching conventional boat fenders to docks and piers to form dock bumpers, the system comprising:

at least one strap means for securing around a boat fender to attach the boat fender to a boat docking structure;

at least two brackets having a means for attaching the brackets to the boat docking structure with one bracket on each side of the fender and a means for receiving the at least one strap adjustably secured to the at least two brackets for securing the fender to the boat docking structure between the two brackets;

wherein the at least one boat fender further comprises an opening through a longitudinal centerline of the at least one boat fender and further comprising a line means which is capable of being attached to the boat docking structure and capable of insertion through the opening in the at least one boat fender to assist in securing the at least one boat fender to the boat docking structure.

2. The system of claim 1 wherein four brackets and two straps are used to secure each boat fender to the boat docking structure thereby preventing movement of the boat fender relative to the boat docking structure upon impact of a boat with the fender.

3. The system of claim 2 wherein each of the brackets comprises a flat structure of strong tear-resistant flexible material having a series of openings through the bracket to receive a series of screw means for attaching each of the brackets to a boat docking structure.

4. The system of claim 1 wherein a series of boat fenders are aligned linearly and attached to the boat docking structure with two sets of brackets and strap means applied to each of the boat fenders.

5. The system of claim 4 wherein a series of boat fenders are aligned linearly along a horizontal portion of the boat docking structure.

6. The system of claim 4 wherein a series of boat fenders are aligned linearly along a vertical portion of the boat docking structure.

7. A dock number attaching system for boat docks and piers for attaching conventional boat fenders to docks and piers to form dock bumpers, the system comprising:

at least one strap means for securing around a boat fender to attach the boat fender to a boat docking structure;

at least two brackets having a means for attaching the brackets to the boat docking structure with one bracket on each side of the fender and a means for receiving the at least one strap adjustably secured to the at least two brackets for securing the fender to the boat docking structure between the two brackets;

wherein a series of boat fenders are aligned linearly and attached to the boat docking structure with two sets of brackets and strap means applied to each of the boat fenders; and wherein a series of boat fenders are aligned linearly along a vertical portion of the boat docking structure; and wherein the at least one boat fender further comprises an opening through a longitudinal centerline of the at least one boat fender and further comprising a line means which is capable of being attached to the boat docking structure above the at least one fender and capable of insertion through the opening in the at least one boat fender to assist in securing the at least one boat fender to the boat docking structure with the line means tied in a knot at a bottom of the at least one fender larger than the opening in the at least one boat fender.

8. A dock bumper attaching system for boat docks and piers for attaching conventional boat fenders to docks and piers to form dock bumpers, the system comprising:

at least one strap means for securing around a boat fender to attach the boat fender to a boat docking structure;

at least two brackets having a means for attaching the brackets to the boat docking structure with one bracket on each side of the fender and a means for receiving the at least one strap adjustably secured to the at least two brackets for securing the fender to the boat docking structure between the two brackets;

wherein four brackets and two straps are used to secure each boat fender to the boat docking structure thereby preventing movement of the boat fender relative to the boat docking structure upon impact of a boat with the fender; and wherein each of the brackets comprises a flat structure of strong tear-resistant flexible material having a series of openings through the bracket to receive a series of screw means for attaching each of the brackets to a boat docking structure.

9. The system of claim 8 wherein each of the brackets further comprises two parallel slotted openings through the bracket on a portion of the bracket extending away from the boat docking structure for receiving an end of one of the strap means through the two slotted openings for adjustably securing the end of the strap means to the bracket.

10. The system of claim 8, wherein the at least one boat fender further comprises an opening through a longitudinal centerline of the at least one boat fender and further comprising a line means which is capable of being attached to the boat docking structure and capable of insertion through the opening in the at least one boat fender to assist in securing the at least one boat fender to the boat docking structure.

* * * * *